United States Patent [19]

Sakao et al.

[11] Patent Number: 5,313,336
[45] Date of Patent: May 17, 1994

[54] REARVIEW MIRROR ASSEMBLY FOR MOTOR VEHICLE

[75] Inventors: Masahito Sakao; Masaharu Tsuruoka, both of Saitama, Japan

[73] Assignee: Kabushiki Kaisha Matsuyama Seisakusho, Japan

[21] Appl. No.: 899,240

[22] Filed: Jun. 16, 1992

Related U.S. Application Data

[63] Continuation of Ser. No. 677,591, Mar. 26, 1991, abandoned, which is a continuation of Ser. No. 480,549, Feb. 15, 1990, abandoned.

[30] Foreign Application Priority Data

Feb. 15, 1989 [JP] Japan .................................. 1-16651

[51] Int. Cl.$^5$ .......................... B60R 1/06; G02B 7/18
[52] U.S. Cl. ................................... 359/841; 359/872; 359/877; 248/478; 248/488
[58] Field of Search ............... 350/604, 606, 631, 632, 350/633, 634, 636, 637; 248/468, 478, 488, 900, 475.1; 359/841, 871, 872, 877

[56] References Cited

U.S. PATENT DOCUMENTS

| | | | |
|---|---|---|---|
| 4,506,954 | 3/1985 | Enomoto | 350/634 |
| 4,555,166 | 11/1985 | Enomoto | 350/634 |
| 4,693,571 | 9/1987 | Kimura et al. | 359/877 |
| 4,696,555 | 9/1987 | Enomoto | 248/900 |
| 4,764,004 | 8/1988 | Yamada et al. | 350/632 |
| 4,768,871 | 9/1988 | Mittelhauser et al. | 350/632 |
| 4,786,156 | 11/1988 | Kotani et al. | 350/637 |
| 4,877,214 | 10/1989 | Toshiaki et al. | 350/637 |

FOREIGN PATENT DOCUMENTS

| | | | |
|---|---|---|---|
| 2036818 | 1/1972 | Fed. Rep. of Germany | 350/637 |
| 2462308 | 11/1976 | Fed. Rep. of Germany | 248/466 |
| 56-143135 | 10/1981 | Japan | 350/604 |
| 0191141 | 11/1982 | Japan | 350/637 |
| 0139548 | 7/1985 | Japan | 350/632 |
| 0244639 | 12/1985 | Japan | 350/637 |
| 62-170346 | 10/1987 | Japan . | |
| 63-37321 | 10/1988 | Japan . | |
| 430661 | 6/1935 | United Kingdom | 248/488 |

Primary Examiner—Bruce Y. Arnold
Assistant Examiner—R. D. Shafer
Attorney, Agent, or Firm—Merchant, Gould, Smith, Edell, Welter & Schmidt

[57] ABSTRACT

A rearview mirror assembly for use on a motor vehicle includes a bracket swingably mounted on a base connected to a motor vehicle body and a mirror holder support member housed in a frame of the bracket. The frame of the bracket has a plurality of projecting engaging edges which engage the mirror holder support member. The mirror holder support member is biased into abutment against the engaging edges of the bracket frame under the bias of a resilient plate fastened to the bracket.

5 Claims, 5 Drawing Sheets

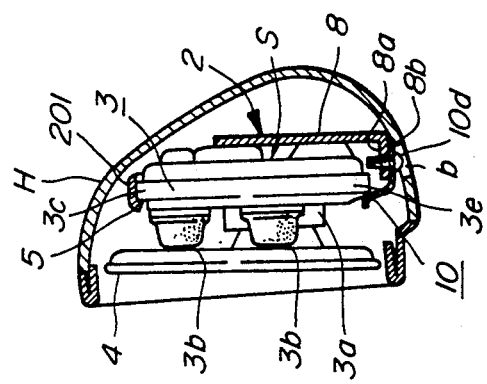
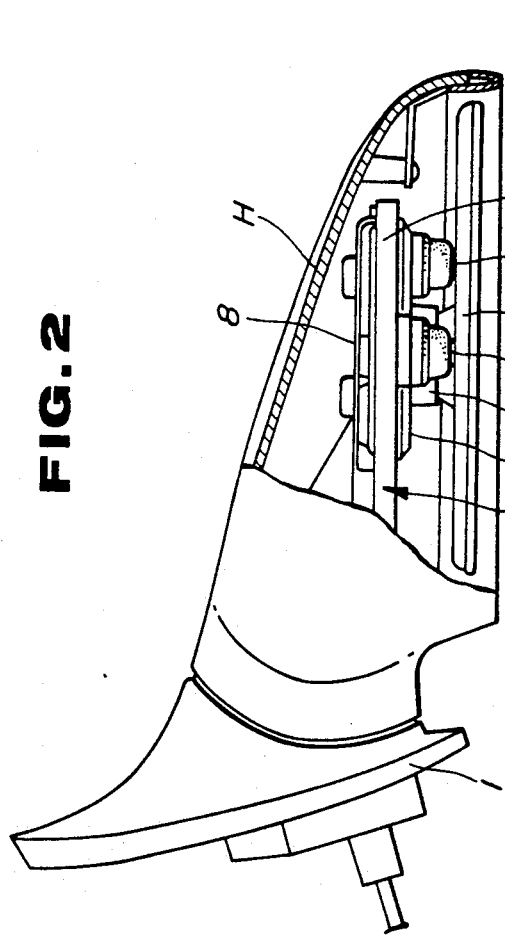
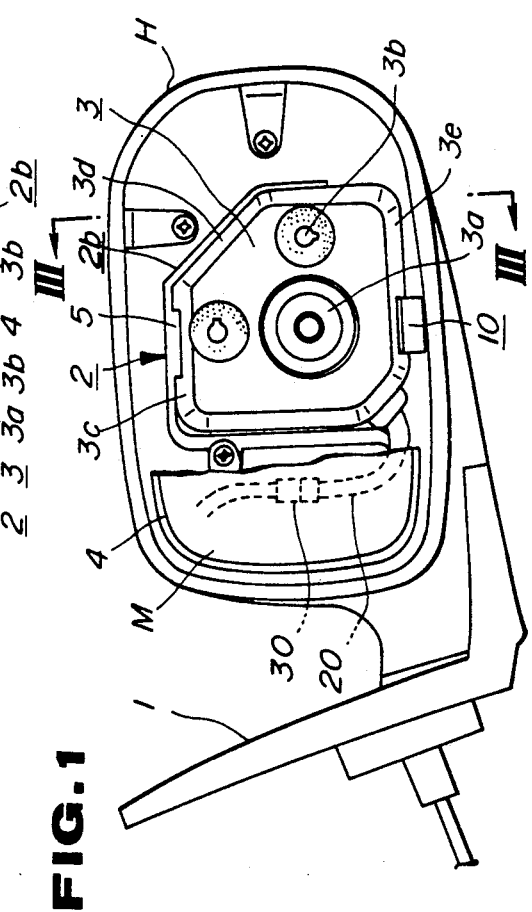

REARVIEW MIRROR ASSEMBLY FOR MOTOR VEHICLE

This is a continuation of application Ser. No. 07/677,591, filed Mar. 26, 1991, which was abandoned upon the filing hereof, and which was a continuation of application Ser. No. 07/480,549, filed Feb. 15, 1990, which was abandoned upon the filing of application Ser. No. 07/677,591.

BACKGROUND OF THE INVENTION

1. Field of the Invention

The present invention relates to a rearview mirror assembly for a motor vehicle, and more particularly to an attachment structure for a mirror support of an automotive rearview mirror assembly.

2. Description of the Relevant Art

Rearview mirror assemblies for use on motor vehicles include a mirror holder supported by a mirror holder support unit which is attached to a bracket connected to a motor vehicle body. When the mirror held by the mirror holder is damaged, the rearview mirror is not replaced in its entirety since it would be time-consuming and costly to replace the entire rearview mirror assembly with a new rearview mirror assembly. Instead, the mirror holder is detached from the bracket, then the mirror holder is removed from the mirror holder support unit, and replaced with a mirror holder on which a new mirror is mounted. To allow such a mirror replacement, the mirror holder support unit is detachably mounted on the bracket.

Japanese Laid-Open Utility Model Publication No. 62(1987)-170346 discloses a rearview mirror assembly for a motor vehicle, which includes a mirror holder support member and a metal plate disposed behind the mirror holder support member. The metal plate and the mirror holder support member are fastened to each other by a plurality of screws. The metal plate has fingers on its upper end which engage a bracket, with the lower end of the metal plate being fixed to the bracket by screws from below. The mirror holder support member is thus attached to the bracket. With such an attachment structure, however, since the lower end of the metal plate is attached to the bracket by the screws from below, the lower end tends to wobble in the horizontal direction.

A rearview mirror assembly disclosed in Japanese Utility Model Publication No. 63(1988)-37321 has a mirror holder support member having engagement holes defined in its upper end and screw threading portions in its lower end. The engagement holes receive fingers on a bracket, and the screw threading portions and a lower end of the bracket are fastened to each other by screws, thereby attaching the mirror holder support member to the bracket. The upper and lower ends of the mirror holder support member are fixed to the bracket by the fingers and screws, respectively. Consequently, the bracket cannot absorb the thermal expansion of the mirror holder support member due to the heat thereof.

SUMMARY OF THE INVENTION

It is an object of the present invention to provide a rearview mirror assembly for use on a motor vehicle, which includes a mirror support that is securely attached to a bracket without wobbling movement and whose thermal expansion and shrinkage can be absorbed.

A rearview mirror assembly according to the present invention comprises a mirror, a mirror support means on which the mirror is tiltably supported, and a bracket having a holding means for holding the mirror support means. The holding means comprises a biasing means for resiliently biasing a portion of the mirror support means, and an engaging means having at least one engaging portion on the bracket. The mirror support means is pressed against the engaging portion under the force of the biasing means.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a front elevational view of a rearview mirror assembly for a motor vehicle according to the present invention;

FIG. 2 is a plan view, partly cut away, of the rearview mirror assembly shown in FIG. 1;

FIG. 3 is a cross-sectional view taken along line III—III of FIG. 1;

DETAILED DESCRIPTION OF THE PREFERRED EMBODIMENTS

As shown in FIG. 1, a base 1 is fixed to a motor vehicle body (not shown), and a bracket 2 of metal has its proximal end angularly movably mounted on the base 1. The bracket 2 supports a mirror holder support member 3 which is made of synthetic resin. The mirror holder support member 3 supports a mirror holder 4 which holds a mirror M. The bracket 2, the mirror holder support member 3, and the mirror holder 4 are housed in a housing H.

Figure 5:
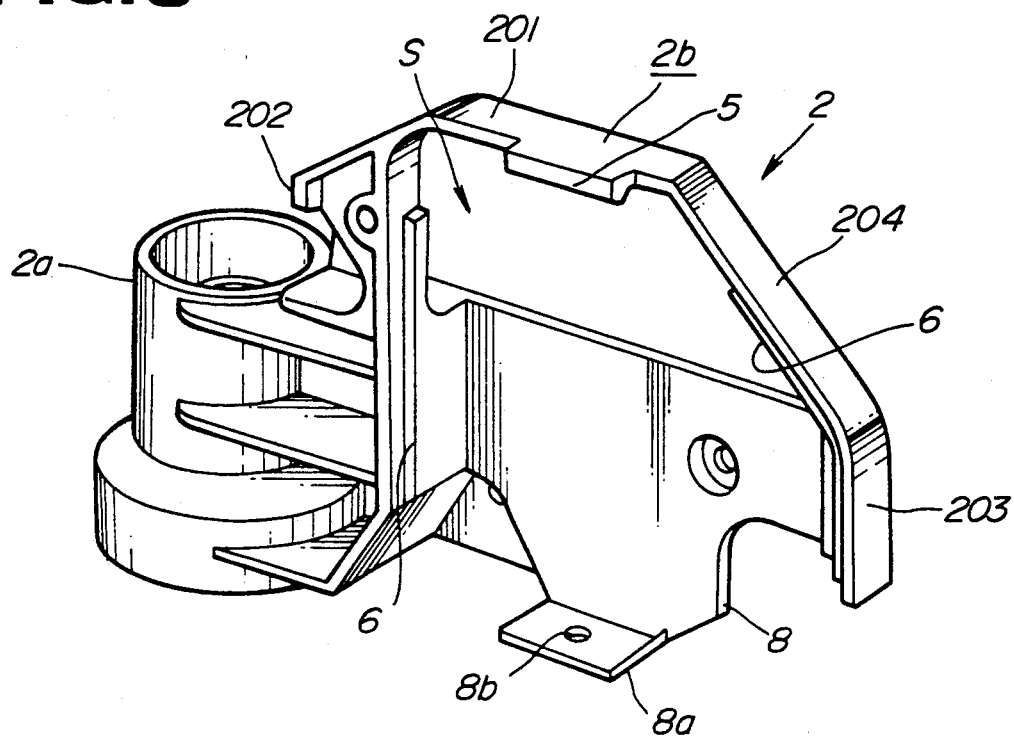
FIG. 5 is an enlarged perspective view of the bracket shown in FIG. 1.
Figure 6:
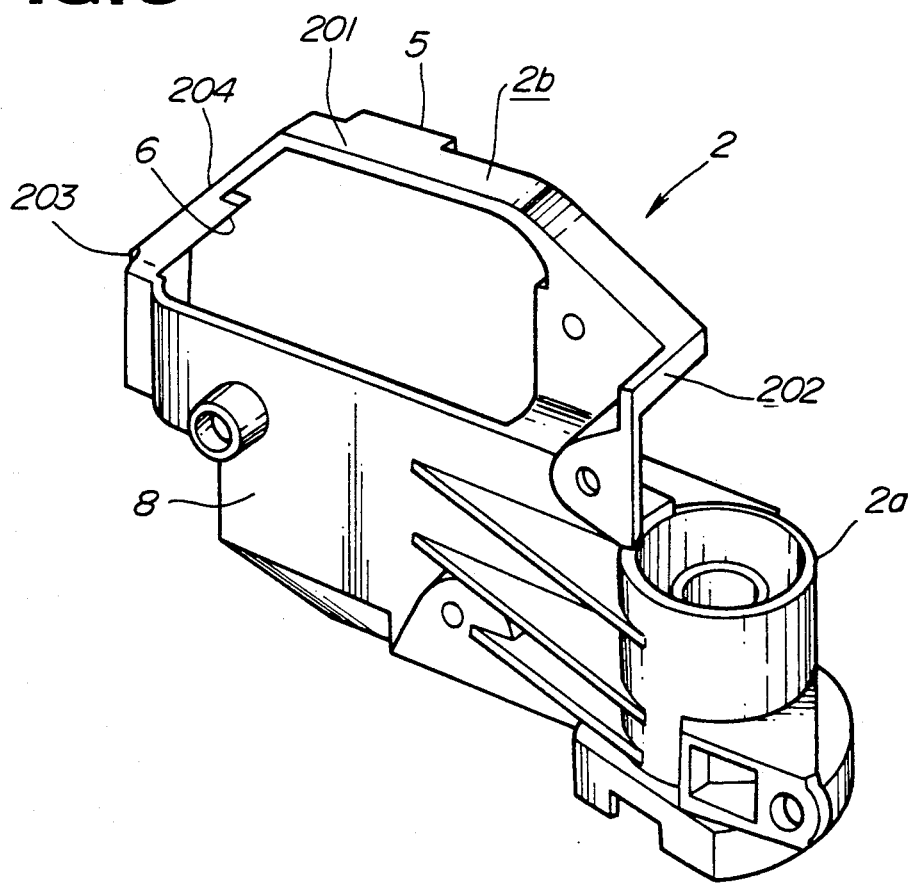
FIG. 6 is an enlarged perspective view of the bracket, as viewed from behind, shown in FIG. 5.

As shown in FIGS. 5 and 6, the bracket 2 has on its proximal end a cylindrical member 2a which is rotatably fitted over a fixed shaft (not shown) fixed to the base 1, so that the bracket 2 is angularly movable with respect to the base 1. The bracket 2 also has a frame 2b extending from the cylindrical member 2a. The frame 2b comprises an upper portion 201, a pair of left and right side portions 202, 203, and a slanted portion 204 extending between the upper portion 201 and the right side portion 203. The upper portion 201 has a first integral engaging edge 5, and the side portions 202, 203 and the slanted portion 204 have second integral engaging edges 6 on their inner surfaces.

The frame 2b has an integral support surface portion 8 on its back. The frame 2b and the support surface portion 8 jointly define a space S in which the mirror holder support member 3 is to be disposed. The support surface portion 8 has an integral flange 8a projecting forwardly from a lower edge thereof. A resilient plate 10 (FIGS. 1, 3, and 4) serving as a biasing means is attached to the flange 8a.

As shown in FIGS. 1 through 3, the mirror holder support member 3 has, on its front side, a support 3a which supports the mirror holder 4, and a pair of operating rods 3b engaging the mirror holder 4 and movable back and forth by a motor (not shown). The mirror holder support member 3 is disposed in the space S, and has an upper portion 3c whose front edge engages the first engaging edge 5, a rear portion 3d engaging the second engaging edges 6, and a lower portion 3e engaging the resilient plate 10.

Figure 7:
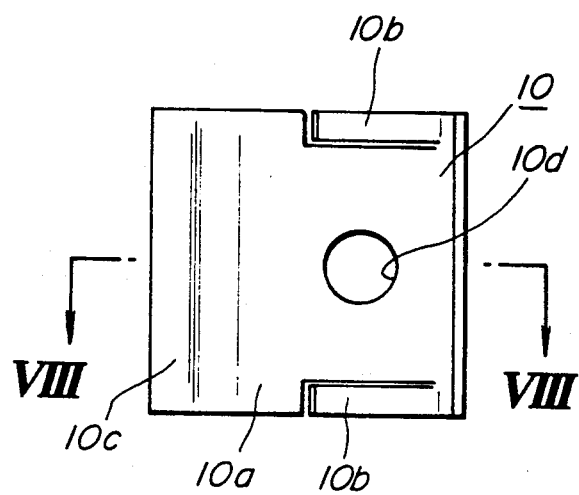
FIG. 7 is an enlarged plan view of a resilient plate.
Figure 8:
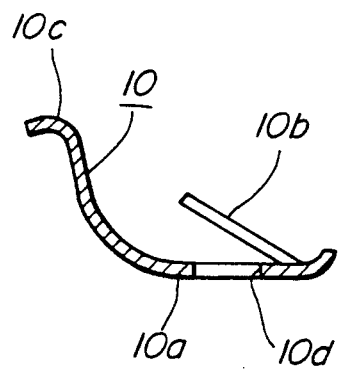
FIG. 8 is a cross-sectional view taken along line VIII—VIII of FIG. 7.

As shown in FIGS. 7 and 8, the resilient plate 10 comprises a main body 10a, a pair of finger members 10b projecting obliquely upwardly from side edges of the main body 10a, and a biasing or engaging portion 10c extending curvilinearly from a distal end of the main body 10a.

The resilient plate 10 is fastened to the flange 8a by a screw b which is threaded through a hole 10d defined in the main body 10a into a hole 8b defined in the flange 8a. With the resilient plate 10 thus fastened, the engaging portion 10c abuts resiliently against a lower front edge of the mirror holder support member 3. Therefore, the resilient force of the engaging portion 10c acts in the direction indicated by the arrow A in FIG. 4, thus reliably supporting the mirror holder support member 3 against the frame 2b.

As described above, the upper portion 3c of the mirror holder support member 3 engages the first engaging edge 5, and the rear portion of the mirror holder support member 3 engages the second engaging edges 6. Consequently, the mirror holder support member 3 is reliably held in place. The mirror holder support member 3 is pushed by the engaging portion 10c obliquely upwardly in the direction indicated by the arrow A, as described above. Therefore, the mirror holder support member 3 is prevented from wobbling vertically and back and forth. The resilient plate 10, which is resiliently deformable in the vertical direction, can absorb thermal expansion and shrinkage of the mirror holder support member 3.

Figure 4:
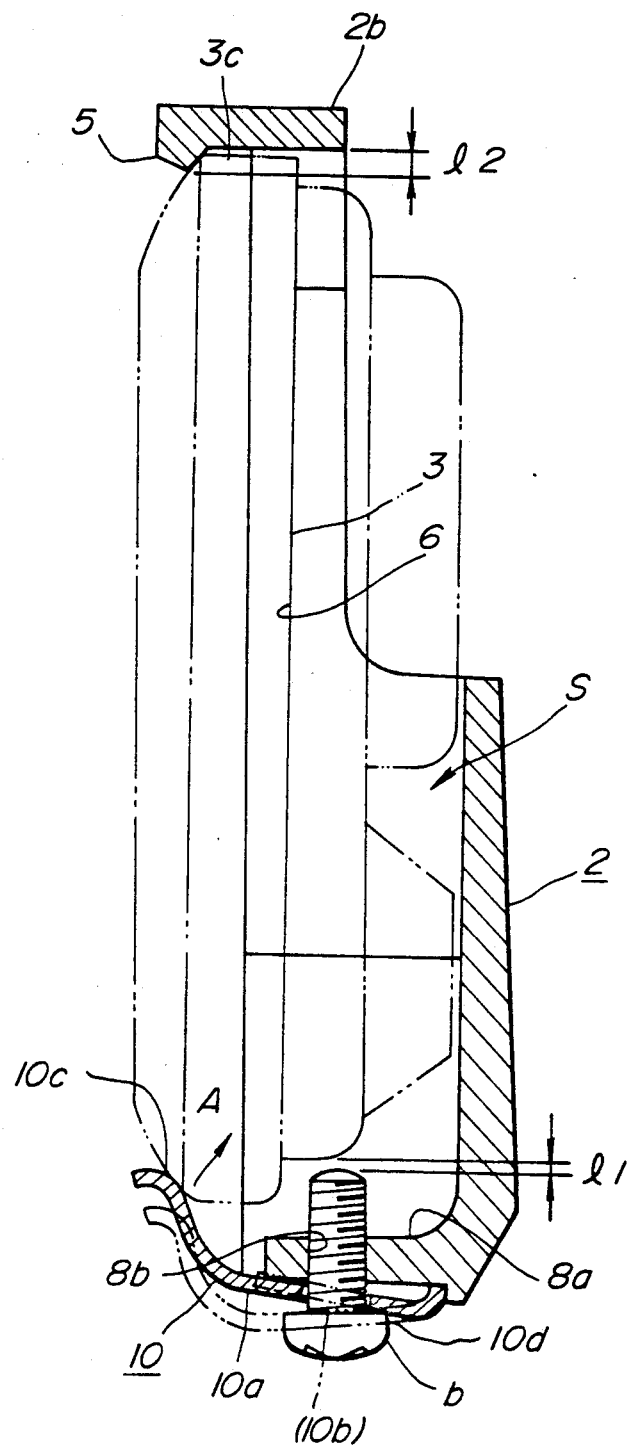
FIG. 4 is an enlarged cross-sectional view, partly cut away, showing a mirror holder support member which is attached to a bracket.

As shown in FIG. 4, the distance l1 between the upper end of the screw b and the lower end of the mirror holder support member 3 is smaller than the height l2 of the first engaging edge 5 (l1 <l2). This dimensional relationship is effective to prevent the upper end of the mirror holder support member 3 from disengaging from the engaging edge 5. Before the screw b is tightened, the erected members 10b abut against the lower surface of the flange 8a, lowering the resilient plate 10, as indicated by the imaginary lines in FIG. 4. Therefore, the mirror holder support member 3 can easily be inserted into the space S, and the resilient plate 10 is prevented from wobbling at the time of assembly.

When the mirror M is damaged, the mirror holder support member 3 is removed from the bracket 2, and then the mirror holder 4 is detached from the mirror holder support member 3. Thereafter, a mirror holder with a new mirror installed is attached to the mirror holder support member 3. When the mirror holder support member 3 itself is damaged, the mirror holder support member 3 is detached from the bracket 2 for replacement.

As shown in FIG. 1, a coupler 30 is mounted on a harness 20 connected to the mirror holder support member 3. The mirror holder support member 3 can easily be detached when the coupler 30 is disconnected.

Figure 9:
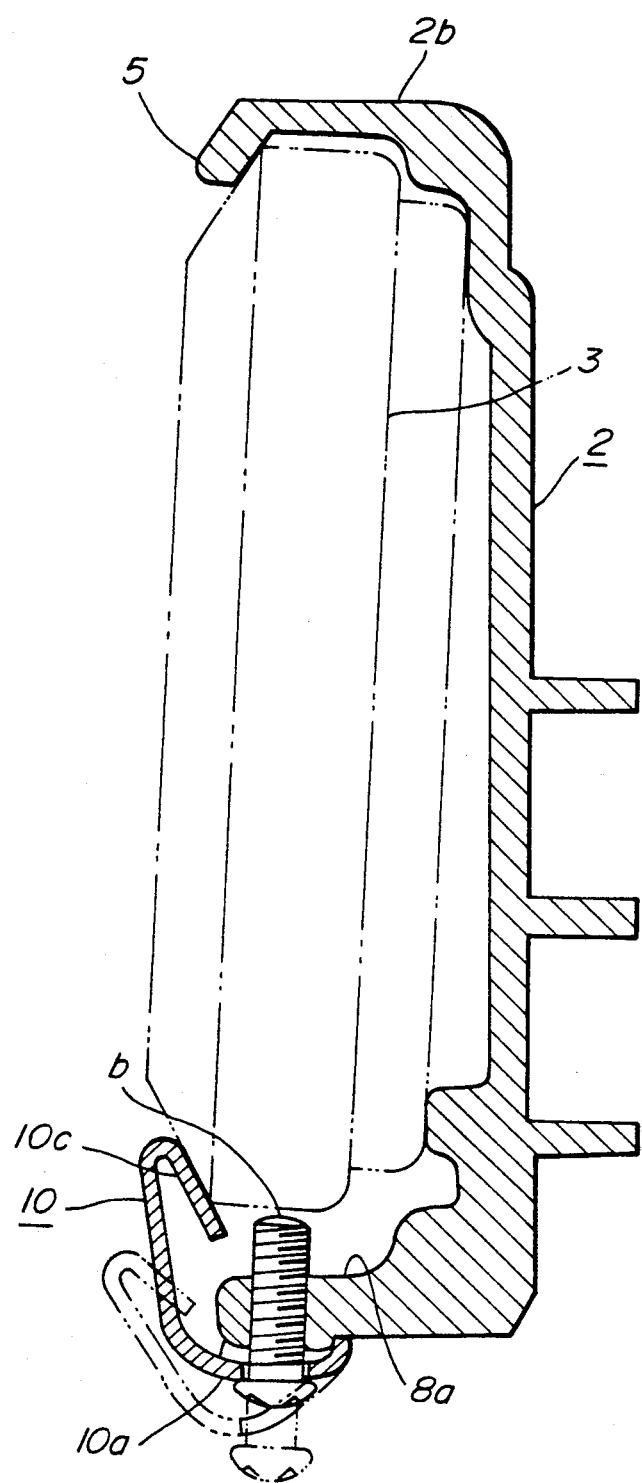
FIG. 9 is a view similar to FIG. 4, but showing a modified resilient plate.

FIG. 9 shows a modification of the present invention. A resilient plate 10 shown in FIG. 9 differs from the resilient plate 10 of the previous embodiment in that it has a V-shaped engaging portion 10c which resiliently engages the mirror holder support member 3. The other structural details of the resilient plate 10 shown in FIG. 9 are the same as those of the resilient plate 10 of the previous embodiment.

In the above preferred embodiment, the mirror holder support member 3 serves as an actuator for actuating the mirror holder 4. However, the mirror holder support member 3 may simply be a support which only supports the mirror holder 4.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

What is claimed is:

1. A side rearview mirror assembly for a motor vehicle comprising:

bracket means mountable to a vehicle body and having a periphery defining a rearward facing space therein;

mirror support means disposed within said space of the bracket means and having spaced apart forward and rearward facing surfaces, said mirror support means being detachably mounted within said bracket means;

mirror means tiltably supported on said mirror support means at the rear facing surface thereof; and a housing for containing said bracket means, said mirror support means and said mirror means therein, said bracket means including first and second spaced apart engagement means adjacent the space defined therein and engageable with said spaced apart forward and rearward facing surfaces of said mirror support means, respectively, and resilient means disposed in spaced apart relation to said first and second engagement means, wherein the resilient means comprises a finger member for urging said mirror support means against said first and second engagement means so as to resiliently hold said mirror support means within said bracket means.

2. A rearview mirror assembly according to claim 1 wherein said first engagement means includes at least one projection extending from one end of said bracket means to engage said rearwardly facing surface of said mirror support means.

3. A mechanism for mounting and adjusting a side rearview mirror mounted on a motor vehicle body, comprising:

bracket means pivotally mountable on the vehicle body for pivoting about a substantially vertical axis, the bracket means including a peripheral margin having at least one pair of spaced apart engaging edges on an inner portion thereof, the bracket means including a support surface within the margin to define an interior volume within an outline of the bracket means jointly with the margin;

mirror support means disposed within the interior volume defined in the bracket means and configured to engage the engaging edges at the interior of the margin and substantially spanning the bracket means, the mirror support means being removable from the bracket means;

rearward facing mirror means coupled to the mirror support means in an interior region thereof and including a mirror surface facing rearwardly therefrom with respect to the vehicle, the mirror means being removably attached to the mirror support means;

resilient means mounted on the bracket means at a marginal position thereof separate from the engaging edges and urging the mirror support means against the engaging edges despite thermal expansion and contraction changes and releasable upon replacement of said mirror support means;

wherein the mirror support means includes motor driven means engaging the mirror means for adjusting the position of the mirror means relative to the mirror support means, and wherein the bracket means includes lip means locking the mirror support means in position on substantially the opposite side from the resilient means.

4. The invention as set forth in claim 3 above, wherein the resilient means comprises a finger member coupled to a marginal portion of the bracket and urging the mirror support means obliquely toward the engaging edges.

5. A side rearview mirror assembly for a motor vehicle comprising:

bracket means mountable to a vehicle body and having a space therein;

rearward facing mirror means including a mirror surface facing rearwardly therefrom with respect to the vehicle;

mirror support means disposed in said space of the bracket means and supporting said mirror means to be movable with respect to said bracket means for providing relative adjustment of the position of said mirror means;

wherein said bracket means includes holding means for resiliently and releasably holding said mirror support means in said bracket means, said holding means comprising:

engagement means provided at a peripheral interior margin of said bracket means and engageable with said mirror support means; and resilient means mounted at a marginal interior position of said bracket means by adjustable fastening means, the resilient means comprising a finger member for urging said mirror support means against said engagement means with resilient force which is releasable upon replacement of said mirror support means by adjustably loosening said fastening means.

* * * * *